(12) United States Patent
Gates

(10) Patent No.: US 6,222,917 B1
(45) Date of Patent: Apr. 24, 2001

(54) METHOD AND APPARATUS FOR PROVIDING A DIRECTORY NUMBER TO A CALL-PROCESSING DEVICE IN A COMMUNICATIONS NETWORK

(75) Inventor: Frank Geoffrey Gates, Alpharetta, GA (US)

(73) Assignee: Nortel Dasa Network Systems GmbH & Co., Immenstaad (DE)

( * ) Notice: Subject to any disclaimer, the term of this patent is extended or adjusted under 35 U.S.C. 154(b) by 0 days.

(21) Appl. No.: 09/078,009

(22) Filed: May 13, 1998

(51) Int. Cl.[7] .................................................. H04M 3/42
(52) U.S. Cl. ........................................... 379/216; 379/355
(58) Field of Search ..................................... 379/188, 190, 379/196, 199, 216, 350, 351, 355, 88.01, 88.03; 455/403, 461, 462, 463, 464

(56) References Cited

U.S. PATENT DOCUMENTS

| | | | |
|---|---|---|---|
| 4,947,422 | * 8/1990 | Smith et al. | 379/200 |
| 5,297,183 | * 3/1994 | Bareis et al. | 379/59 |
| 5,436,957 | * 7/1995 | McConnell | 379/196 |
| 5,659,597 | * 8/1997 | Bareis et al. | 455/563 |
| 5,677,950 | 10/1997 | Brendzel | 379/355 |
| 5,722,088 | * 2/1998 | Storn et al. | 455/564 |
| 5,881,134 | * 3/1999 | Foster et al. | 379/88.01 |

FOREIGN PATENT DOCUMENTS

| | | |
|---|---|---|
| 2 252 696 | 8/1992 | (GB) . |
| 2 282 732 | 4/1995 | (GB) . |
| 2 311 696 | 10/1997 | (GB) . |
| WO 97/11546 | 3/1997 | (WO) . |

\* cited by examiner

*Primary Examiner*—Ahmad Matar
*Assistant Examiner*—Benny Q. Tieu
(74) *Attorney, Agent, or Firm*—Lee, Mann, Smith, McWilliams, Sweeney & Ohlson

(57) ABSTRACT

A method and apparatus for providing a complete directory number to a call-processing device in a communications network is provided. This enables equipment that is designed to "expect" only complete directory numbers (e.g. the whole rather than part of a telephone number) to be used with communication equipment that provides parts of as well as whole directory numbers. For example, a telecommunications switch that is arranged for use in a closed dial plan system can be used in an open dial plan communications network by using the invention. Also, traditional telephone systems can be used with a mobile telephone switch. A learned list of directory numbers is stored and a dialled candidate directory number is compared with items in this list. If a match is found the candidate is known to be a complete directory number and can be passed to the equipment in the communications network which requires this. Post dial delay and the use of special keys such as "#" or a "send" key can be avoided or alternatively used in conjunction with the invention.

10 Claims, 3 Drawing Sheets

METHOD AND APPARATUS FOR PROVIDING A DIRECTORY NUMBER TO A CALL-PROCESSING DEVICE IN A COMMUNICATIONS NETWORK

BACKGROUND OF THE INVENTION

1. Field of the Invention

This invention relates to a method and apparatus for providing a directory number to a call-processing device in a communications network 2. Descrption of the Prior Art A "complete directory number" is a series of one or more digits, such as a telephone number, that is associated with a particular customer identity in a communications network. Usually a complete directory number relates to a particular terminal within the communications network. For example, the complete directory number could be a telephone number associated with a particular mobile telephone terminal or with a particular fax machine. Also, the complete directory number could be a telephone number associated with terminals of an automatic call distribution system.

The term "directory number" is used here to refer to directory numbers that may be complete or may be incomplete. An incomplete directory number is one where some of the digits are missing, e.g. because the user has not yet dialled them.

Historically, complete directory numbers (CDNs) have been allocated by service providers according to numbering plans devised by the service providers themselves. For example, some service providers allocate CDNs according to an "open dial plan". An "open dial plan" is a scheme for allocating directory numbers to customers which allows the length of the customer's CDN (i.e. the number of digits in the CDN) to vary from customer to customer. On the other hand, other service providers allocate CDNs according to a "closed dial plan" and every customer's CDN is the same length.

Open dial plans are complex because variations in the length of nearly all parts of the CDN often occur. For example, the regional code might be one digit for a particular geographical area (such as "1" for London) and for other regions may be three or four digits. For metropolitan areas, many digits are required in addition to the regional code because of the number of customers in the area. For example, if a regional code of one digit is used for London, then a director system of 7 digits (XXX-XXXX) might be required. At other, perhaps rural, exchanges there might be only a few hundred telephone lines so that only 3 digits are required.

In an open dial plan, if the complete directory number 123 exists, then the complete directory number 1234 cannot normally exist. If it did then calls to directory number 1234 would never reach that number because they would be recognised as being for 123 after the third digit.

Closed dial plans are more simple than open dial plans in that every CDN is the same length. This makes it easier for users and equipment to determine when there is an error in a telephone number that they have been given, for example, because it is not long enough. However, both open and closed dial plans are complicated when a localised region grows faster than predicted and more digits are needed to serve customers who require the communications service.

Mixed dial plans are effectively open dial plans that have become too complex to maintain economically at digit collectors.

The existence of closed dial plans (prevalent in North America) and open dial plans (often found in Europe) has led to the development of two distinct schemes for routing a call over a digital telephone network. These schemes typically align with the type of dial plan found in an equipment manufacturer's home market.

The scheme for routing a call in a digital network based on a closed dial plan is now described. Since every CDN is the same length, when a customer starts to dial, the user's switch in the telephone network collects the expected number of digits before attempting to route the call. The dialled digits are divided according to a simple rule into those needed to identify the area (the area code) and the number within that area. For example, consider a North American number 1-12345-67890. As dialled this number would be collected at a switch termed the "originating switch". All the digits are collected and then the first digits are analysed. The leading "1" identifies a long-distance number and therefore the next three digits are used to decide where to send the last 7 digits. On this basis the last 7 digits are sent to an exchange near to the destination address. This local exchange interprets the remaining digits and the call is completed. Some areas may use the first 3 of the last 7 digits to identify an exchange which subtends 10,000 lines that are addressed by the final 4 digits. However, this distinction is often lost where large modem switches which operate for many more than 10,000 lines are used. Such modem switches actually accommodate many of the "old" switches which only survive as partitions in the larger switch.

A method of routing a call in a network based on an open dial plan is now described. First the target area is identified from the leading digits and then every subsequent digit is passed over the network to the target area one at a time. Every subsequent digit has to be passed in this way because the exact number of digits in the CDN is not known before the user finishes dialling. The subsequently dialled digits are used to identify further switching points and the dialled digits are passed on to the next point of ambiguity. This means that many more signalling messages have to be passed between switches before the call is completed than is the case for a closed dial plan system. This is a major disadvantage for open dial plan systems.

A problem arises when systems which have been designed to work with closed dial plans are used in markets or applications with open dial plans. The closed dial system waits to receive a fixed number of digits before doing anything else and so, unless the CDN is coincidentally the expected length, a problem occurs. If the CDN is shorter than expected, then the switch typically waits for further digits until a timeout (an inter-digit time out) expires. At this stage, the switch attempts to complete the call with the digits that have been collected. This succeeds because all the digits have been collected, but the user observes a "dead time" while the time out expires. The "time out" is typically 6 seconds long and this length of delay quickly becomes irritating for the customer and makes the system disadvantageous. If shorter "time out" delays are used other problems are caused. For example, the call may be attempted while the user is still entering digits. Another problem is that if the CDN is longer than expected then the call is not completed. This is because the call will be attempted with too few digits and subsequently dialled digits are ignored. In order to avoid this problem the "expected" CDN length is set to the maximum possible CDN length in the open plan system. This maximum can be very long and because of this the user nearly always experiences the inconvenience of a post-dial delay.

A similar problem is encountered when older technologies are integrated with newer technologies, such as a GSM mobile network. For example, when a customer originates a call from a mobile telephone, such as a GSM phone, the customer keys in the whole DN and then keys a "send" button. The whole DN is then sent to the GSM switch (known as an MSC) which then attempts the call on the assumption that the DN is complete. If the DN is incomplete the call attempt fails and the user is informed. For an open dial plan system, this means that valuable processing capacity has been taken up attempting to make a call for which the DN has been subsequently proven to be incomplete. If special software is written to enable fixed access systems to be integrated with a GSM switch there are several disadvantages, including processing time, memory constraints, development costs, maintenance and testing.

If traditional fixed accesses (traditional telephone systems) are used with a mobile network switch (usually used for mobile telephones), for example, as part of a fixed-mobile convergence programme, then the user does not have a "send" key to indicate that the DN is complete. In this case, the access network or the mobile switch has to determine when the DN is complete by some other means before attempting the call. However, it is difficult to provide "other means" by which this is determined.

Three approaches have previously been taken to address the problem of post-dial delay. The first approach involves re-writing closed dial plan switch software so that it will be able to cope with open dial plan systems. This re-writing is a complex and lengthy process because the original switch software is based on a closed dial plan system and so "digit capture" is at the core of the software and cannot be easily adapted. By carrying out this re-write the software is arranged to pass each digit on to the next switch in the connection one at a time. Also, the switch is modified so that it does not attempt to accumulate digits beyond the number necessary to identify the next switching point. There are a number of problems with this approach. The signalling load is increased significantly because of the need to pass the additional single-digit messages through the network. Also, it is expensive, complex and lengthy to re-write the switch software as required. Furthermore, this method cannot easily and economically be used to address the integration of fixed access systems to a mobile network.

A second approach has been to require the customer to press a special key after the DN has been dialled (e.g. a "send" key). This abbreviates the post-dial delay. For example the "#" key is often used for this purpose but it is unpopular and inconvenient for the user. Also, simple telephones which use loop-disconnect (pulse) dialling instead of tone (dual tone multi-frequency, DTMF) dialling remain incompatible.

A third approach is to use initial digits to identify that the DN belongs to a closed dial plan. The list of pre-fixes can be very large so that many closed dial plan regions are known about. For example, the international pre-fix (e.g. 00) followed by the North American code (1) would indicate that exactly another 10 digits are required (xx-xxx-xxxx). Similarly, dialling the prefix for a mobile network (0171 in Germany, for example) would indicate that exactly another 7 digits are required (xxx-xxxx). This solution is extremely powerful, but depends upon the individual digit collectors being educated with the identifying characteristics of the closed dial plans, and being re-educated if these characteristics change.

It is accordingly an object of the present invention to provide an apparatus and method for providing a directory number to a call-processing device in a communications network which overcomes or at least mitigates one or more of the problems noted above.

SUMMARY OF THE INVENTION

According to a first aspect of the present invention there is provided a method of providing a directory number to a call-processing device in a communications network comprising the steps of:

(i) collecting one or more digits dialled by a calling party in the communications network;

(ii) searching a list of stored directory numbers for a directory number which contains only the collected digits; and (iii) if a directory number is found, providing that directory number to the call-processing device.

A corresponding apparatus is also provided for providing a directory to a call-processing device in a communications network comprising:

(i) a collector arranged to collect one or more digits dialled by a calling party in the communications network;

(ii) a searcher arranged to search a list of stored directory numbers for a directory number which contains only the collected digits; and (iii) a provider arranged such that if a directory number is found, provision of the directory number to the call-processing device is effected.

The invention also encompasses a corresponding communications network comprising:

(a) a call processing device; and (b) an apparatus for providing a directory number to a call-processing device said apparatus comprising:

(i) a collector arranged to collect one or more digits dialled by a calling party in the communications network;

(ii) a searcher arranged to search a list of stored directory numbers for a directory number which contains only the collected digits; and (iii) a provider arranged such that if a directory number is found, provision of the directory number to the call-processing device is effected.

This provides the advantage that communications equipment that is designed for use in a closed dial plan system can be used in an open dial plan system. This can be done without carrying out an expensive and complex "rewrite" of call processing software for the communications equipment. Even equipment that may not otherwise have been commercially viable to adapt for open plan dialling systems can be used. Also, equipment that is arranged to "expect" only complete directory numbers can be used in situations where complete directory numbers might not always be provided by users or terminal equipment. For example, where fixed access telephone tenninals are used in conjunction with a mobile telephone switch. Post-dial delay is reduced in situations where an inter-digit "time out", would otherwise be used to determine the end of dialling. Also, it is no longer essential to use a special key such as "#" to indicate that the directory number has been completed. This makes communications equipment such as telephone terminals more familiar and easier to use. Another advantage is that because closed dial plan equipment can be used in an open dial plan system, then the number of signalling messages that need to be passed through the network is reduced. This reduces network costs, throughput requirements and complexity.

In one embodiment, said call-processing device is a mobile switch and said calling party is subtended from a fixed access system. This has the advantage that mobile telephone service providers are able to provide a service for conventional telephone systems as well. By using the invention to ensure that only complete directory numbers are presented from the conventional telephone terminals to the mobile telephone switch the system is able to function effectively and without modification.

Preferably the method further comprises the steps of:
(i) if a directory number is not found, forming a candidate directory number from the collected digits, providing this to the call-processing device and attempting to complete a call using the candidate directory number;
(ii) determining a result of the call attempt; and
(iii) on the basis of said result, adding the candidate directory number to the stored list of directory numbers.

This has the advantage that if no complete directory number is found with certainty, the dialled number can be used anyway to make a call attempt. Also, this enables the list of directory numbers to be added to so that in future, when a directory number is dialled, it is more likely to be identified and confirmed quickly and successfully to set up a call.

Advantageously, said list of directory numbers further comprises an indication of when each directory number was last used in a call attempt. This provides the advantage that when the list of directory numbers becomes full it can continue to reflect the recent and most relevant dialling habits by replacing the oldest items in the list.

According to a second aspect of the present invention there is provided a method of providing a directory number to a call-processing device in a communications network comprising the steps of:
(i) collecting one or more digits dialled by a calling party in the communications network;
(ii) monitoring an elapsed time since one of said digits was dialled;
(iii) if said elapsed time exceeds a time limit, providing the directory number, comprising the collected digits, to the call-processing device; and
(iv) adjusting said time limit on the basis of information about previous time intervals between dialled digits.

An apparatus, corresponding to the second aspect of the present invention and for providing a directory number to a call-processing device in a communications network comprises:
(i) a collector arranged to collect one or more digits dialled by a calling party in the communications network;
(ii) a monitor arranged to monitor an elapsed time since one of said digits was dialled;
(iii) a provider arranged to provide the directory number, comprising the collected digits, to the call-processing device, if said elapsed time exceeds said time limit; and
(iv) an adjuster arranged to adjust said time limit on the basis of information about previous time intervals between dialled digits.

The second aspect of the present invention also encompasses a communications network comprising:
(a) a call-processing device; and
(b) an apparatus for providing a directory number to the call-processing device, said apparatus comprising:
(i) a collector arranged to collect one or more digits dialled by a calling party in the communications network;
(ii) a monitor arranged to monitor an elapsed time since one of said digits was dialled;
(iii) a provider arranged to provide the directory number, comprising the collected digits, to the call-processing device, if said elapsed time exceeds said time limit; and
(iv) an adjuster arranged to adjust said time limit on the basis of information about previous time intervals between dialled digits.

This provides the same advantages as for the first aspect of the invention. Any post-dial delay is reduced and this makes communications equipment such as telephone terminals easier to use and more familiar.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Definitions

The term, "complete directory number" (or CDN) is used to refer to a irectory number which specifies a unique called party address.

The term, "called party" is used to refer to an entity in a communications network with which it is desired to establish a connection.

The term, "calling party" is used to refer to an entity in a communications network which requires to establish a connection with another entity in the communications network.

The term "call-processing device" is used to refer to any function or component that is arranged to accept at least part of a directory number, process this and provide an output.

One example of the invention provides a way in which complete directory numbers are recognised before being provided to a device in a communications network. For example, some devices used in communications networks, such as switches, are typically designed for use in either open or closed dial plan systems. If a switch is designed for use in a closed dial plan system it is arranged to expect only complete directory numbers rather than to process "on the fly" a series of digits which may or may not be a complete directory number. One application of the invention is therefore to allow equipment designed for use in a closed dial plan system to be used in an open dial plan system. This is done by arranging for only complete directory numbers to be provided to the equipment by using the invention. In this way post-dial delays can be avoided because the equipment "knows" that the directory number is complete and so it is not necessary to wait in case further digits will be dialled. Also, the user does not have to use a special key to indicate the end of dialling. Another advantage is that because closed dial plan equipment can be used in an open dial plan system, then the number of signalling messages that need to be passed through the network is reduced. This reduces network costs, throughput requirements and complexity.

Another application of the invention is to allow equipment which always "expects" complete directory numbers to be used in other situations. For example, a mobile switch (MSC) typically always "expects" complete directory numbers, identified by the use of a "send" key to be provided. In order to use this type of switch in conjunction with conventional fixed access systems, such as conventional telephones (e.g. POTS) it is necessary to arrange for complete directory numbers to be provided to the switch.

Figure 1:
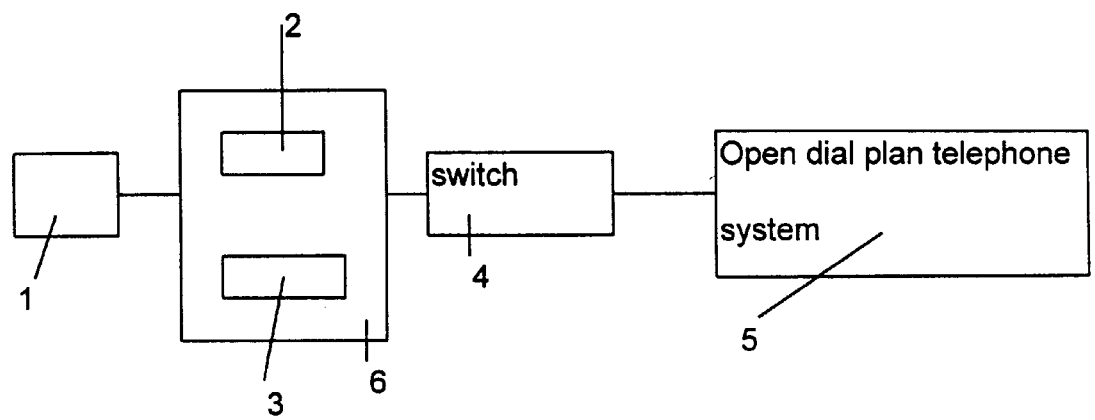
FIG. 1 is a general schematic diagram of an arrangement for using a closed dial plan type switch together with an open dial plan telephone system.

FIG. 1 shows schematically an arrangement for using a closed dial plan type switch 4 together with an open dial plan telephone system 5. A digit collector 2 is provided which collects dialled digits from a terminal 1 (many other terminals 1 may be connected to the digit collector as well although these are not shown in FIG. 1). These collected digits form a candidate directory number (DN). Also provided is a list of stored directory numbers (the CDN list) and means for searching this list, 3. The digit collector 2 and the list 3 together form apparatus 6 for providing a complete directory number to the call process. This apparatus can be integrated into the switch 4 or alternatively may be a separate entity. This list contains complete directory numbers (e.g. telephone numbers) that have been successfully used to set up a call before, as well as other numbers such as telephone numbers (that are complete directory numbers) for the emergency services. The CDN list is searched to find a CDN that matches the candidate DN. If a match is found then it is known that the candidate DN is a complete DN and this can be passed to the switch 4. Because only complete DNs are provided (by the apparatus 6) to the switch 4 then the fact that the switch is designed for a closed dial plan system does not matter and the switch 4 can be used effectively with the open dial plan telephone system 5.

Figure 2:
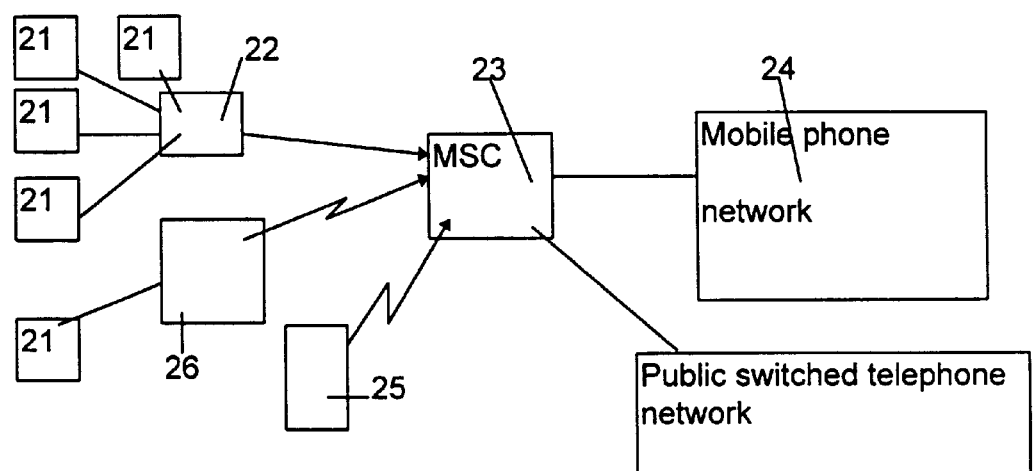
FIG. 2 is a general schematic diagram indicating how the invention can be used to enable fixed access systems such as conventional copper wire telephones to be integrated with a mobile telephone switch (MSC).

FIG. 2 is a general schematic diagram indicating how the invention can be used to enable fixed access systems such as conventional copper wire telephones 21 to be integrated with a mobile telephone switch (MSC) 23 and also a mobile telephone network 24 and a public switched telephone network. A digit collector and a stored list of CDNs are provided in a device 22 which may be called a "fixed access concentrator" although this is not a standard term. The fixed access concentrator 22 acts to "collect up" the connections from the fixed access system terminals 21 and present these to the mobile switch 23. The mobile switch 23 is designed to "expect" complete directory numbers as inputs from mobile terminals 25 These complete directory numbers are each terminated by a "send" key. For example, the user of mobile terminal 25, in order to make a call attempt, keys in the directory number and then presses a "send" key. In order for the mobile switch 23 to operate effectively with the conventional fixed access terminals 21 the switch 23 needs to be able to accept complete directory numbers from them, without the use of a "send" key. This is because conventional telephones 21 typically do not require use of a "send" key and it would confuse and irritate users if they had to use a "send" key in this situation. By using the concentrator 22 a similar method can be used as describe above for FIG. 1 in order to provide only complete DNs to the mobile switch 23.

Figure 3:
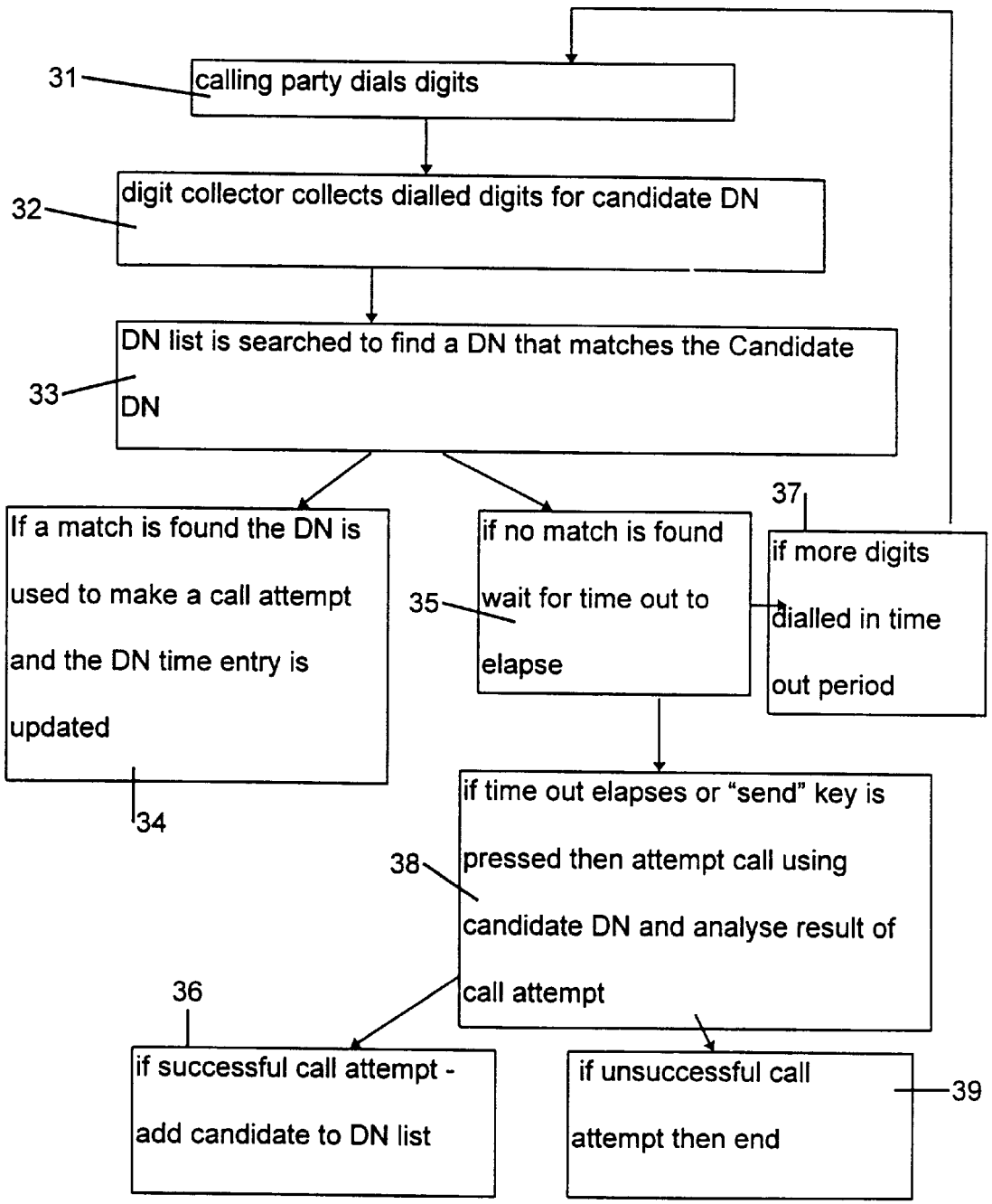
FIG. 3 is a flow diagram giving examples of the steps involved in providing a complete directory number to a switch or other device in a communications network.

FIG. 3 is a flow diagram giving examples of the steps involved in providing a complete directory number to a switch or other device in a communications network. A calling party 31 dials digits and these are collected by a digit collector 32. The collected digits form a candidate DN. A CDN list is then searched to find a CDN that matches the candidate DN as shown at box 33 in FIG. 3. Any known searching algorithm can be used and this is discussed further below. If a match is found 34 the candidate DN is known to be complete and is provided to the required device in the communications network. For example, the complete DN could be passed to a router to route the call and try to establish a connection with the called party. If the stored CDN list is limited in size, each CDN entry in the list can be given a time "stamp" to indicate how long it has been in the list. When the list is full the oldest CDN is replaced. If this method is used, then when a match is found the time entry for that DN is updated.

If no match is found 35 then the apparatus or system "waits" for the time out period. If more digits are dialled 37 then the process returns to box 31 as indicated by the arrow between boxes 37 and 31 in FIG. 3. If the time out elapses or the send key is pressed then a call attempt is made using the candidate DN (see box 38). If the candidate DN is used when no match was found then the results of that use are analysed. If the use is successful, for example, the candidate DN is used for a call attempt and a call is established (or the called party is found to be "busy"), then the candidate DN is known to be complete and is added to the CDN list (see box 36). CDNs can also be added to the CDN list in several other ways which are described further below.

Generation of the CDN list

The method succeeds in identifying a complete DN when there is an entry or that particular DN in the CDN list. This means that it is important for the CDN list to contain as many as possible of the CDNs which might be dialled. Clearly it is not possible to store all possible CONs, but, fortunately, most subscribers have a comparatively small repertoire of frequently dialled CDNs and it is sufficient to store these. These CDNs are added to the list using a "learning" process whereby CDNs from successful call attempts are retained. Other less frequently dialled CDNs, may be important to recognise quickly such as the CDNs of emergency services.

The list is formed by merging two parts: a permanent store which is used to record CDNs deemed important, and a temporary store which stores other CDNs. The permanent store is created by the service provider and is not affected by customer actions. The temporary store is more dynamic and the contents change according to the customer's actions. Each record in the temporary store contains two fields: the CDN and the date/time on which it was last used.

The following actions result in a CDN being added to the temporary store: When a customer dials a DN which is not in the CDN list then the algorithm will not identify it as being complete. However, other schemes (such as inter-digit time-out expiry or keying a "#") are used to determine that the DN may be complete and to attempt a call with the digits collected. When the call is attempted it is possible to determine whether the DN was a complete DN by inspecting the result. If the call results in the called party being alerted, or an indication that the called party is busy then the call is successful and the CDN may be added to the temporary store. If a CDN is provided in the Called Line Identification part of the connect message returned from the called party then this may be added to the temporary store as well since the DN as dialled may have contained an excess of digits which would not be dialled again.

CDNs presented by terminating calls in the Calling Line Identification (CLI) field of the setup message (e.g. telephone numbers of customer's who telephone you) are also added to the temporary store. These CDNs must exist and it is probable that calls will be subsequently attempted to them.

The procedure for adding a CDN to the temporary store is:

If the CDN is already in the temporary store then the dateltime field is updated to the current date/time.

If the temporary store is full (no room for new CDNs) then the oldest CDN, identified by the earliest date/time field, is replaced by the new CON and the date/time field is set to the present value.

If the temporary store is not full, the new CON is added with the dateltime field set to the present date/time.

Searching the CDN list

Many known methods are available for quickly searching for an item in a list such as the CDN list. Any of these may be used, but it is important to remember that each search or "query" need not be attempted "from scratch". For example, this can be done by ordering the list of CDNs in numerical order as described below. If the list or database were searched every time a new digit was collected and accumulated in the candidate CDN, the database would be in a continuous state of query and the method described below reduces this problem.

For example, the database may be in the form of a list stored in CDN order. The first digit received by the digit collector is for example, 3. This digit causes a query pointer (this is a marker which marks or points to an item in the list) to run down the list of CDNs to the place in the list where the 3's start. If there is only one CDN in the list which starts with the digit 3 then the query (or search) is successful. If there is more than one CDN in the list which starts with a 3 then the next digit is collected and this is, for example, the digit 7. The query pointer then runs further down the list to where the "37's " start. If there is only one item in the list that starts with a "37" then the query is successful.

The CDN list is advantageously shared between several users, for example, the same number of users as use a particular access device such as the fixed access concentrator 22 in FIG. 2. This could be, for example, 3000 users. In this way, one user benefits from another user who causes the common temporary list to be updated. The fact that the list is larger when it is shared between several users does means that search times increase but this increase is not overwhelming. For example, if an ordered list is twice as long it does not take twice as long to search. By using a CDN list that is shared by several users an important advantage is achieved. That is, if an individual CDN list is used for each user then entries are only found in the list if the user has previously dialled those numbers (unless they are from the permanent list e.g. emergency numbers). By sharing the CDN list between several users then entries in the list can be found even when a particular user has not dialled that number before. Also, by using a large CDN list the likelihood of infrequently dialled numbers being removed from the list is reduced.

A particular user might use the telephone rarely but always to dial the same number. In this situation, the CDN entry in the list may become very old and so likely to be removed from the list when the list fills up. In order to avoid the rarely used but perhaps important number from being removed from the list a third type of temporary list can be used. This would be a list of individually preferred CDNs. For example, the last ten CDNs dialled by an individual user could always be retained in the CDN list.

Figure 4:
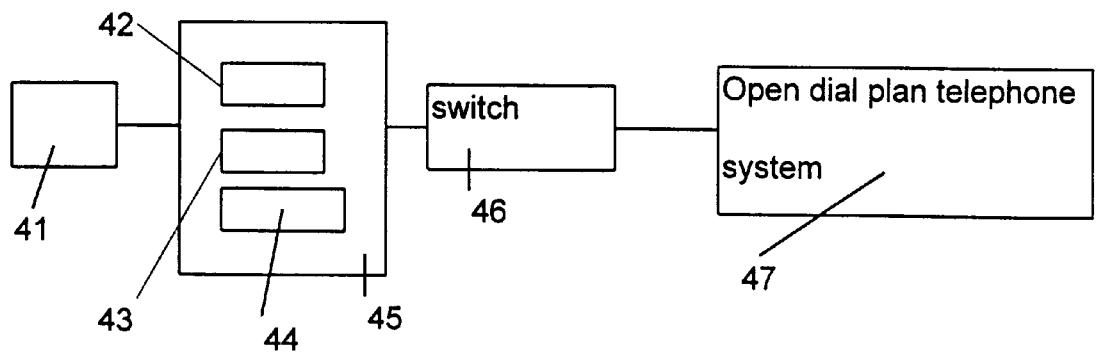
FIG. 4 shows schematically another arrangement for using a closed dial plan type switch together with an open dial plan telephone system.

FIG. 4 shows schematically another arrangement for using a closed dial plan type switch 46 together with an open dial plan telephone system 47. A digit collector 42 is provided which collects dialled digits from a terminal 41 (many other terminals 41 may be connected to the digit collector as well although these are not shown in FIG. 4). These collected digits form a candidate directory number (DN). Also provided is a timer 43 that is arranged to determine inter dialling event intervals. The timer 43 comprises a pre-dial timer. This determines the interval between when the user picks up a telephone handset from the terminal 41, until the first digit is dialled. The timer 43 also determines the time that elapses until the next dialling event. This is often referred to as inter-digit timing. Pre-dial and inter-digit time interval information is recorded in a register together with information about associated dialled digits. The timer 43 is then set back to zero and the time interval until the next dialling event (typically the second dialled digit) occurs. A determiner 44 is also provided. The determiner 44 is provided with information about a time limit. This is a "time out" interval. If the pre dialling interval exceeds this time limit then the call is abandoned (if no digits have been collected by the collector 42). If the inter-digit timer valve exceeeds the time limit and digits have been collected by the collector 42, then the call is attempted using the collected digits. The time limit is typically given an initial value of around 6 seconds or longer. As explained above this leads to irritating delays for the user. In order to reduce this delay, the time limit is adjusted by the determiner 44 using information about the inter dialling event intervals and pre-dialling intervals provided by the timer 43. The digit collector 42, the timer 43, and the determiner 44 together form apparatus 45 for providing a directory number to the call processing device or switch 46. This apparatus can be integrated into the switch 46 or alternatively may be a separate entity. Using this method typically only complete DNs are provided (by the apparatus 45) to the switch 46 so that the fact that the switch is designed for a closed dial plan system does not matter and the switch 46 can be used effectively with the open dial plan telephone system 47.

The determiner 44 is able to adjust the time limit by using information about the inter dialling event intervals provided by the timer 43. This is because when users dial digits they often follow predictable dialling patterns. For example, if the user-dialled digits are received with a uniform inter-digit delay then there is a very high probability that the directory number is being dialled by a machine. In this case, every inter-digit delay will be the same to a high degree of accuracy. By detecting that the inter-digit delay is uniform at an early stage in dialling of the directory number, the time limit can be safely reduced to a level just larger than the measured inter-digit delay. The time limit can be profitably set to a "safe" value which might be twice the delay experienced between earlier digits in the directory number. This time limit is then very much shorter than the typical 6 seconds normally allowed for a human user; the user using the machine will experience an acceptably short post dial delay (in the order of 100s of milliseconds for example).

A dialling habit exhibited by some human users is to dial directory numbers in bursts where the bursts correspond to groups of code numbers. For example, the international access code and country code, the area code and finally the local number. This habit often mirrors the way in which directory numbers are written (e.g. 49 7541 25132 often results in three bursts —0049. . . 7541 . . 25132).

Another habit observed by the inventor is the dialling of numbers in pairs. A user identified as exhibiting this habit in dialling previous CDNs. and who seems to be showing the same habit on the current number is provided with alternate long and short time limits. The shorter time limit is set between digits of a couplet and the longer time limit is set after each couplet to allow for the delayed delivery of another digit. In the following digit stream <s> and <↑> are used to indicate short and long allowed time limits, while the series of dots (. . .) are used to indicate the user's pauses between dialled digits. The method is able to operate after the pattern has been identified, for example, after two couplets:

00. . 49. . 75. .<|> . . 4<s> 5<|> . . 1<s> 3<|> . . . 2<s> . . . . X

X represents the point where the directory number is identified as being potentially complete, because the time limit is exceeded.

The series of inter dialling event intervals can be thought of as a time series and the determiner 44 essentially forecasts a future value of this time series. This forecasted value is then used by the determiner 44 to adjust the time limit. For example, the time limit is typically longer than the forecasted future inter-digit delay. In this way the determiner 44 is acting as a predictor. Any suitable type of predictor can be used. For example, a rule based predictor can be used. In this case a set of rules is created which describe various dialling patterns or habits, such as the "couplets" and "burst" patterns mentioned above. Other patterns and habits may be identified by studying the behaviour of human diallers and then incorporating this knowledge into the rule based system. Alternatively, a neural network based predictor can be used. For example, a neural network arranged to accept inputs corresponding to inter digit delays and produce a single output corresponding to a predicted future inter digit delay could be used. The neural network is first trained using a set of training data that comprises information about inter-digit dialling intervals for complete directory numbers of known length. After training is completed, dialling event intervals are input to the neural network which produces a predicted inter digit delay as output. Any suitable type of neural network can be used for this purpose, for example, a multi-layer perceptron network.

Another possibility would be to use a neural network to classify a particular user's dialling behaviour into one of a number of types. For example, these types could be "dials in couplets", "dials with a constant inter digit delay", "dials with a random inter digit delay" and "dials in bursts corresponding to the way a directory number is typically written". Once this classification is established, the determiner 44 could use a set of rules or other similar system to adjust the time limit appropriately. In this situation the neural network would have several outputs, one for each type of dialling behaviour.

Figure 5:
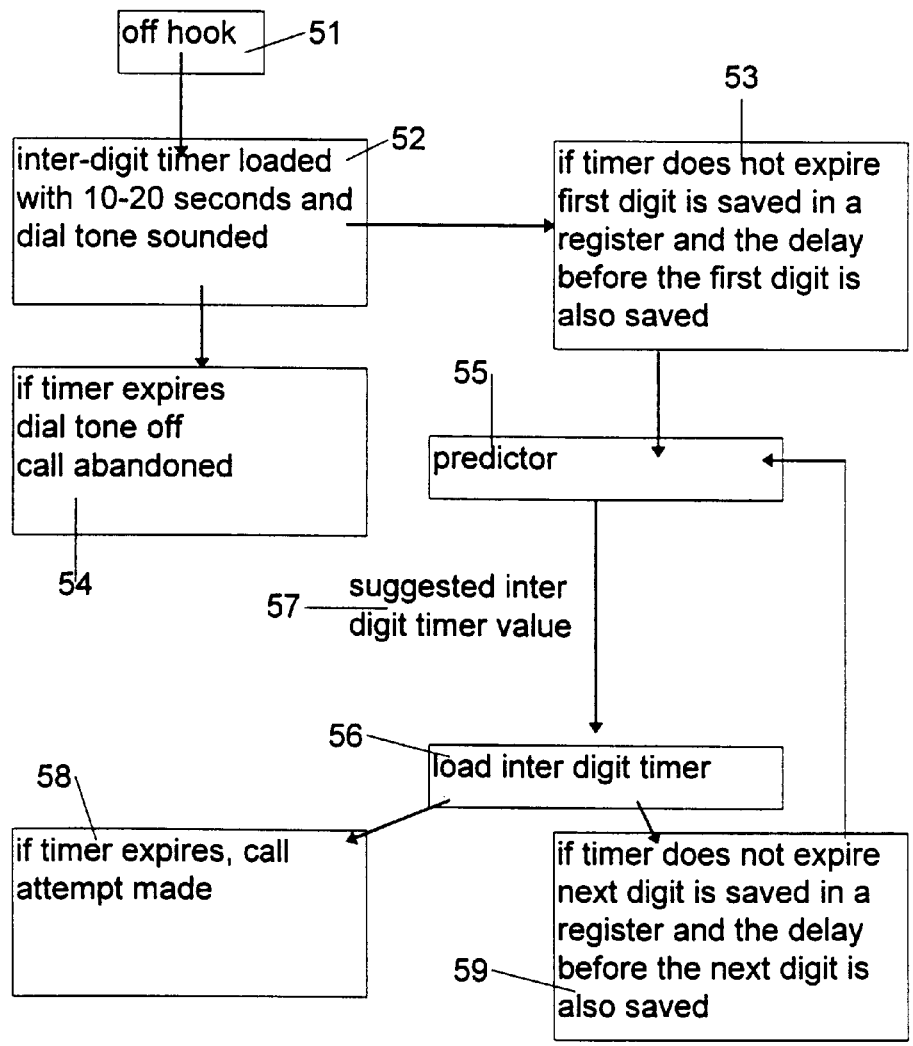
FIG. 5 is a flow diagram giving examples of the steps involved in providing a directory number to a switch or other device in a communications network.

FIG. 5 is a flow diagram showing examples of steps involved to provide a directory number to a switch or other device in a communications network. For example, the user begins to make a telephone call by picking up the hand piece of a conventional telephone handset. This is represented by box 51 in FIG. 5. An inter-digit timer within the handset is then initiated and a dial tone sounds in order to alert the user to the fact that dialling can now be started. This is represented by box 52 in FIG. 5. The inter-digit timer may be a timed switch which can be adjusted to operate for different time intervals. For example, the inter-digit timer is first set for a time interval (or time out value) of around 10 to 20 seconds. If the user does not dial any digits within this time interval then the timer expires, the dial tone is switched off and the call is abandoned (see box 54 in FIG. 5). If the user does dial a digit within the timer interval then this first dialled digit is stored in a register (see box 53 in FIG. 5). information about the delay between initiation of the inter-digit timer and input of the first dialled digit is also stored in a register. This information can be the magnitude of the delay, or the relative length of the delay in relation to say, the "time out" interval. Any other suitable information can be used.

Any suitable method can be used to obtain the information about the delay between initiation of the inter-digit timer and input of the first dialled digit. For example, the timed switch used for the inter-digit timer may be modified to record the magnitude of this delay. Alternatively, a separate timer may be used.

The information about the delay is provided to a predictor 55. This predictor produces an output which is a "suggested" inter-digit timer value. The predictor, as mentioned above, is arranged to forecast a value for the next digit dialling interval. The idea is to predict how long it will be before the user dials the next digit. Once this value is estimated or predicted, it is used by the predictor 55 to produce a suggested inter-digit timer value 57. For example, this value might be a multiple of the forecasted digit dialling interval.

Any suitable predictor 55 can be used. As mentioned above, neural network based predictors, rule-based predictors and other types of predictors can be used. It is also possible to provide additional inputs to the predictor 55. For example, the number of digits dialled so far, the values of the digits dialled so far and the previous value of the inter-digit timer. Information like this often helps to produce more accurate predictions.

The predictor 55 can be trained or arranged to use information from a specific user or from a group of users. For example, if the predictor 55 is arranged to accept only information about one user then the particular dialling habits of this user can be traced over time. A particular rule or set of rules could be used to describe the dialling behaviour of that particular user. This will provide advantages for that user by reducing post-dial delay. However, if the behaviour of the user changes unexpectedly, or if a different user is involved, the predictor 55 will not perform well. The predictor may therefore advantageously be arranged to deal with information from a group of users. This makes the overall system more flexible and robust.

The output of the predictor 55 is then used to set or "load" the inter-digit timer as shown in box 56 of FIG. 5. If the inter-digit timer expires before any further digits are dialled then a call attempt is made using the stored dialled digits (see box 58 of FIG. 5). if another digit is dialled before the inter-digit timer expires, then this digit is stored in a register or other storage facility. Also, information about the delay between initiation of the inter digit timer and dialling of the latest digit is recorded or stored. This information is then provided to the predictor 55 and a suggested inter-digit timer value produced. Information about previous delays between initiation of the inter digit timer and dialling may also be provided to the predictor 55 again at this stage. Alternatively, this information may be stored in the predictor 55 itself. This suggested value is used to load or set the inter-digit timer and the process repeats as indicated in FIG. 5.

The methods described above are advantageously used in combination with the other known methods to determine that the DN is complete. For example, the following criteria or methods can be used:

If the "#" key (or other abbreviating signal) is pressed then the system should attempt the call using the digits collected.

If the inter-digit timer expires, then the system should attempt the call using the digits collected.

If there are prefix digits which identify a closed dial plan then the requisite number of digits should be collected.

If the prefix digits are not recognised (i.e. they do not identify a closed dial plan) then the DN list is used to identify a complete DN.

A range of applications are within the scope of the invention. These include situations in which an access network must present CDNs to a switch expecting complete DNs and also those in which switches normally expect DNs to be presented for routing by a digit collector which uses a digit count to identify complete DNs.

What is claimed is:

1. A method of providing a directory number to a call-processing device in a communications network comprising the steps of:
   (i) collecting one or more digits dialled by a calling party in the communications network;
   (ii) monitoring an elapsed time since one of said digits was dialled;
   (iii) if said elapsed time exceeds a time limit, providing the directory number, comprising the collected digits, to the call-processing device; and
   (iv) adjusting said time limit on the basis of information about previous time intervals between dialled digits.

2. A method as claimed in claim 1 wherein said time interval(s) are between consecutively dialled digits.

3. A method as claimed in claim 1 wherein said step (iv) of adjusting said time limit comprises inputting said time interval(s) into a neural network.

4. A method as claimed in claim 1 wherein said step (iv) of adjusting said time limit comprises inputting said time intervals(s) into a rule based system.

5. A method as claimed in claim 1 which further comprises determining the number of collected digits and adjusting the time limit on the basis of the number of collected digits.

6. A method as claimed in claim 1 which further comprises the steps of:
   (i) searching a list of stored directory numbers for a directory number which contains only the collected digits; and
   (ii) if a directory number is found, providing that directory number to the call-processing device.

7. An apparatus for providing a directory number to a call-processing device in a communications network comprising:
   (i) a collector arranged to collect one or more digits dialled by a calling party in the communications network;
   (ii) a monitor arranged to monitor an elapsed time since one of said digits was dialled;
   (iii) a provider arranged to provide the directory number, comprising the collected digits, to the call-processing device, if said elapsed time exceeds said time limit; and
   (iv) an adjuster arranged to adjust said time limit on the basis of information about previous time intervals between dialled digits.

8. An apparatus as claimed in claim 7 which further comprises:
   (i) a searcher arranged to search a list of stored directory numbers for a directory number which contains only the collected digits; and
   (iii) a provider arranged such that if a directory number is found, provision of the directory number to the call-processing device is effected.

9. A communications network comprising:
   (a) a call-processing device; and
   (b) an apparatus for providing a directory number to the call-processing device, said apparatus comprising:
      (i) a collector arranged to collect one or more digits dialled by a calling party in the communications network;
      (ii) a monitor arranged to monitor an elapsed time since one of said digits was dialled;
      (iii) a provider arranged to provide the directory number, comprising the collected digits, to the call-processing device, if said elapsed time exceeds said time limit; and
      (iv) an adjuster arranged to adjust said time limit on the basis of information about previous time intervals between dialled digits.

10. A communications network as claimed in claim 9 wherein said apparatus for providing a directory number further comprises:
   (i) a searcher arranged to search a list of stored directory numbers for a directory number which contains only the collected digits; and
   (iii) a provider arranged such that if a directory number is found, provision of the directory number to the call-processing device is effected.

* * * * *